US009905858B2

(12) United States Patent
Zhou et al.

(10) Patent No.: US 9,905,858 B2
(45) Date of Patent: *Feb. 27, 2018

(54) FUEL CELL WITH AN IMPROVED ELECTRODE (71) Applicant: Second Sight Medical Products, Inc., San Fernando, CA (US)

(72) Inventors: David Daomin Zhou, Saugus, CA (US); Robert J. Greenberg, Los Angeles, CA (US)

(73) Assignee: Second Sight Medical Products, Inc., Sylmar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/752,700

(22) Filed: Jan. 29, 2013

(65) Prior Publication Data

US 2013/0143148 A1 Jun. 6, 2013

Related U.S. Application Data (62) Division of application No. 11/260,002, filed on Oct. 26, 2005, now Pat. No. 8,389,434.

(51) Int. Cl.
| | |
|---|---|
| *H01M 4/88* | (2006.01) |
| *C25D 21/12* | (2006.01) |
| *B01J 23/42* | (2006.01) |
| *H01M 4/94* | (2006.01) |
| *C25D 3/50* | (2006.01) |
| *H01M 4/90* | (2006.01) |
| *B01J 37/34* | (2006.01) |
| *C25D 5/16* | (2006.01) |

(Continued)

(52) U.S. Cl.
CPC ........ *H01M 4/8853* (2013.01); *B01D 53/945* (2013.01); *B01J 23/08* (2013.01);
(Continued)

(58) Field of Classification Search
None
See application file for complete search history.

(56) References Cited

U.S. PATENT DOCUMENTS 2,913,511 A * 11/1959 Grubb, Jr. ..................... 429/480
3,252,839 A * 5/1966 Langer ................ C25B 11/0489
204/294

(Continued)

FOREIGN PATENT DOCUMENTS

WO WO 2004/061163 A1 7/2004

OTHER PUBLICATIONS

"Platinized Platinum Electrodes", A.M. Feltham & M. Spiro, Department of Chemistry, Imperial College of Science and Technology, London S.W.7, England; Chemical Reviews, 1971, vol. 71, No. 2; pp. 178-193.

(Continued)

*Primary Examiner* — Melvin C Mayes
*Assistant Examiner* — Michael Forrest
(74) *Attorney, Agent, or Firm* — Scott Dunbar (57) ABSTRACT An improved platinum and method for manufacturing the improved platinum wherein the platinum having a fractal surface coating of platinum, platinum gray, with a increase in surface area of at least 5 times when compared to shiny platinum of the same geometry and also having improved resistance to physical stress when compared to platinum black having the same surface area. The process of electroplating the surface coating of platinum gray comprising plating at a moderate rate, for example at a rate that is faster than the rate necessary to produce shiny platinum and that is less than the rate necessary to produce platinum black. Platinum gray is applied to manufacture a fuel cell and a catalyst.

12 Claims, 7 Drawing Sheets (51) Int. Cl.
*H01M 4/92* (2006.01)
*B01J 35/00* (2006.01)
*H01M 8/00* (2016.01)
*B01D 53/94* (2006.01)
*B01J 23/08* (2006.01)
*B01J 23/40* (2006.01)
*B01J 23/44* (2006.01)
*B01J 23/46* (2006.01)
*B01J 37/02* (2006.01)
*H01M 8/1007* (2016.01)

(52) U.S. Cl.
CPC ............... *B01J 23/40* (2013.01); *B01J 23/42* (2013.01); *B01J 23/44* (2013.01); *B01J 23/468* (2013.01); *B01J 37/0215* (2013.01); *B01J 37/348* (2013.01); *C25D 3/50* (2013.01); *C25D 5/16* (2013.01); *C25D 21/12* (2013.01); *H01M 4/90* (2013.01); *H01M 4/92* (2013.01); *H01M 4/921* (2013.01); *H01M 4/94* (2013.01); *H01M 8/1007* (2016.02); *B01D 2255/1021* (2013.01); *B01J 35/002* (2013.01); *H01M 4/8807* (2013.01); *H01M 8/00* (2013.01); *Y02P 70/56* (2015.11); *Y02T 10/22* (2013.01)

(56) References Cited

U.S. PATENT DOCUMENTS

| | | | |
|---|---|---|---|
| 3,284,240 A | | 11/1966 | Kring et al. |
| 3,287,168 A | * | 11/1966 | Marsh ................ H01M 4/8803 205/103 |
| 3,424,617 A | | 1/1969 | Grieger et al. |
| 4,240,878 A | | 12/1980 | Carter |
| 4,473,481 A | | 9/1984 | Fukutsuka et al. |
| 4,502,492 A | | 3/1985 | Brennen et al. |
| 4,628,933 A | | 3/1986 | Michelson |
| 4,837,049 A | | 6/1989 | Byers et al. |
| 5,109,844 A | | 5/1992 | de Juan, Jr. et al. |
| 5,215,088 A | | 6/1993 | Normann et al. |
| 5,571,158 A | | 11/1996 | Bolz et al. |
| 5,609,611 A | | 3/1997 | Bolz et al. |
| 5,632,770 A | | 5/1997 | Schaldach |
| 5,822,177 A | | 10/1998 | Popp et al. |
| 5,871,511 A | | 2/1999 | Bolz et al. |
| 5,935,155 A | | 8/1999 | Humayun et al. |
| 5,964,794 A | | 10/1999 | Bolz et al. |
| 6,040,077 A | | 3/2000 | Debe et al. |
| 6,219,581 B1 | | 4/2001 | Schaldach et al. |
| 6,230,061 B1 | | 5/2001 | Hartung |
| 6,292,703 B1 | | 9/2001 | Meier et al. |
| 6,400,989 B1 | | 6/2002 | Eckmiller |
| 6,458,157 B1 | | 10/2002 | Suaning |
| 6,522,294 B2 | | 2/2003 | Meier |
| 6,974,533 B2 | * | 12/2005 | Zhou ........................ 205/264 |
| 2003/0192784 A1 | * | 10/2003 | Zhou ........................ 205/109 |
| 2005/0075709 A1 | | 4/2005 | Brennen et al. |

OTHER PUBLICATIONS

"Fractual Coated Leads: Advanced Surface Technoloy of Genuine Sensing and Pacing", M. Schaldach, Department of Biomedical Engineering, Erlangen-Nuremberg, Germany; Progress in Biomedical Research, Jun. 2000; pp. 259-272.

* cited by examiner

FUEL CELL WITH AN IMPROVED ELECTRODE

CROSS-REFERENCE TO RELATED APPLICATIONS

This application is a divisional application of U.S. patent application Ser. No. 11/928,114, filed Oct. 30, 2007, for "A Catalyst and Method for Manufacturing the Same", now abandoned, which is a divisional application of application Ser. No. 11/260,002, entitled "A Catalyst and a Method for Manufacturing the Same", filed Oct. 26, 2005, now U.S. Pat. No. 8,389,434, which is a continuation in part of application Ser. No. 11/198,361, "Platinum Surface Coating and Method for Manufacturing the Same", filed Aug. 4, 2005, now abandoned, the disclosure of which is incorporated herein by reference, which is a divisional of application Ser. No. 10/226,976, "Platinum Electrode and Method for Manufacturing the Same" filed Aug. 23, 2002, now U.S. Pat. No. 6,974,533, the disclosure of which is incorporated herein by reference, which claims the benefit of U.S. Provisional Application No. 60/372,062, "Platinum Deposition for Electrodes", filed Apr. 11, 2002, the disclosure of which is incorporated herein by reference.

FEDERALLY SPONSORED RESEARCH

This invention was made with government support under grant No. R24EY12893-01, awarded by the National Institutes of Health. The Government has certain rights in the invention.

BACKGROUND OF THE INVENTION

Field of the Invention

The field of the invention relates to a catalyst especially for a fuel cell and autocatalyst and electrode surface coating and electroplating processes for deposition of surface coating, especially in a fuel cell and a catalyst.

Description of Related Art

Platinum has often been used as a preferred catalyst material for electrodes in fuel cells, especially fuel stacks for cars, and in autocatalysts. A catalyst, especially a platinum catalyst is a crucial part in a fuel cell. The catalytic reaction takes place on the surface of the electrodes. The electricity is created by the catalytic reaction when a fuel such as Hydrogen is electrochemically oxidized to protons on the surface of the anode. Platinum is known to be an excellent catalyst for fuel cells; however it is a very expensive material.

Since platinum has a smooth surface and its surface area is limited by the geometry of the electrode, it is not efficient for transferring electrical charge. The platinum with a smooth surface is hereinafter called shiny platinum.

An electrode which is intended for long term use with a nonrenewable energy source must require minimal energy—a high electrode capacitance and correspondingly low electrical impedance is of great importance.

It is known that a catalyst applied on an electrode surface accelerates the electrode reactions and that the transfer current is proportional to the surface area of the electrode. Many attempts are reported trying to improve the ability of a catalyst converting fuel to electricity. Those attempts try to increase the surface area of the electrode without increasing the amount of the expensive platinum catalyst material.

One approach to increase the surface area of a platinum electrode without increasing the electrode size is to electroplate platinum rapidly such that the platinum molecules do not have time to arrange into a smooth, shiny surface. The rapid electroplating forms a platinum surface which is commonly known as platinum black. Platinum black has a porous and rough surface which is less dense and less reflective than shiny platinum. U.S. Pat. No. 4,240,878 to Carter describes a method of plating platinum black on tantalum.

Platinum black is more porous and less dense than shiny platinum. Platinum black has weak structural and physical strength and is therefore not suitable for applications where the electrode is subject to even minimal physical stresses. Platinum black also requires additives such as lead to promote rapid plating. Finally, due to platinum black's weak structure, the plating thickness is quite limited. Thick layers of platinum black simply fall apart.

Fuel stacks for cars use about 2 oz of platinum group metals per unit. Pure platinum catalysts are used for hydrogen fueled fuel cells, while alloys of platinum with ruthenium are typically used for reformed hydrocarbon fuel cells to improve the tolerance of the catalyst to carbon monoxide.

The fuel cell research estimates that loadings can be reduced to about 1 oz per unit through better utilization of platinum and thinner deposition layer. Other estimates show that when fuel cells are commercially produced each engine will require between 0.2 and 0.3 oz platinum per unit.

The main consumer of world platinum group metal supply is the automobile industry. 41% of platinum demand in 2001 was accounted for autocatalyst use. Platinum group metals are used in autocatalysts to facilitate the removal of three of the main combustion byproducts CO, hydrocarbons, and $NO_x$. The use of platinum is increased due to strong growth in production and sales for diesel cars. Diesel autocatalysts only use platinum rather than the mixture of platinum and palladium commonly used in gasoline catalysts.

Platinum is the most common catalyst for fuel cells. However, due to its high cost it is often doped with palladium, ruthenium, cobalt, or more recently iridium or osmium. In addition to its high cost, platinum is also quite rare. In fact, there is not enough platinum in the world to equip every vehicle in use today with a traditional platinum catalyst proton exchange membrane fuel cell. For this reason, there is a high desire to develop new catalysts, and new platinum deposition techniques to reduce the amount of platinum needed for fuel cell catalysts and autocatalysts in general.

For the foregoing reasons there is a need for an improved platinum surface coating and process for coating the surface to obtain an increased surface area for a given geometry and at the same time the coating is structurally strong enough to be used in applications where the platinum surface coating is subject to physical stresses.

SUMMARY OF THE INVENTION

The present invention is directed in part to a catalyst which comprises at least one substrate; and a surface coating of said substrate of at least one of the following metals platinum, palladium or iridium or an alloy of two or more metals, or a combination of two or more alloys or metal layers having an increase in the surface area of 5 times to 500 times of the corresponding surface area resulting from the basic geometric shape.

The present invention is further directed to a fuel cell comprising at least one catalyst.

The present invention is further directed to a catalyst to facilitate the removal of three of the main combustion byproducts CO, hydrocarbons and $NO_x$.

The present invention is further directed to an anode and/or a cathode comprising a substrate wherein the surface coating is electroplated to the surface of a said conductive substrate at a rate such that the particles of metal form on the conductive substrate faster than necessary to form shiny platinum and slower than necessary to form platinum black.

The present invention is further directed to a method for manufacturing of a catalyst by electroplating a surface coating such that surface has a rough surface coating comprising electroplating the surface of a conductive substrate at a rate such that the particles are form on the conductive substrate faster than necessary to form shiny platinum and slower than necessary to form platinum black.

DETAILED DESCRIPTION OF THE INVENTION

Figure 1:
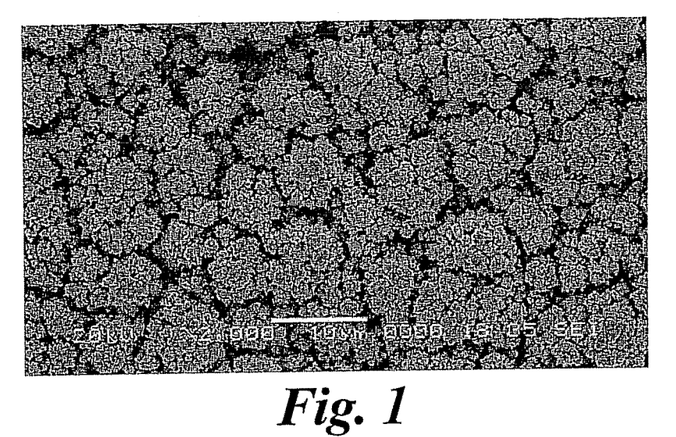
FIG. 1 depicts a platinum gray surface magnified 2000 times.
Figure 2:
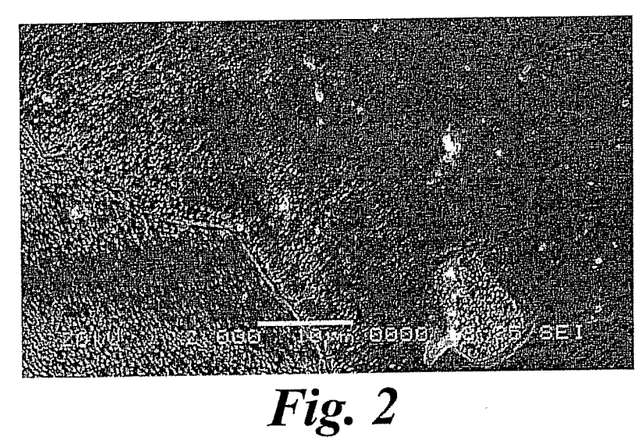
FIG. 2 depicts a shiny platinum surface magnified 2000 times.
Figure 3:
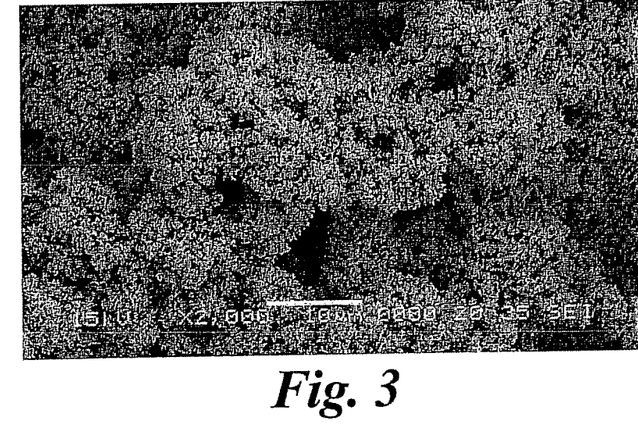
FIG. 3 depicts a platinum black surface magnified 2000 times.

Referring to FIG. 1, an illustrative example of a platinum gray surface coating for an electrode according to the present invention is shown having a fractal surface with a surface area increase of greater than 5 times the surface area over that of a shiny platinum surface of the same geometry, shown in FIG. 2, and an increase in strength over a platinum black surface, shown in FIG. 3. FIGS. 1 to 3 are images produced on a Scanning Electron Microscope at 2000× magnification taken by a JSM5910 microscope (JEOL, Tokyo, Japan). Under this magnification level it is observed that the platinum gray is of a fractal configuration having a cauliflower shape with particle sizes ranging from 0.5 μm to 15 μm. Each branch of such structure is further covered by smaller and smaller particles of similar shape. The smallest particles on the surface layer may be in the nanometer range. This rough and porous fractal structure increases the electrochemically active surface area of the platinum surface when compared to an electrode with a smooth platinum surface having the same geometric shape.

Because no impurities or other additives such as lead need to be introduced during the plating process to produce platinum gray, the surface can be pure platinum. It is very advantageous of not using lead in view of the environment. Lead is likely to lover the catalyst activity in an autocatalyst. This is another advantage of not using any lead in the platinum catalyst. Alternatively, other materials such as iridium, rhodium, gold, tantalum, titanium or niobium could be introduced during the plating process if so desired but these materials are not necessary to the formation of platinum gray.

Platinum gray can also be distinguished from platinum black and shiny platinum by measuring the color of the material on a spectrodensitometer using the Commission on Illumination L*a*b* color scale.

L* defines lightness, a* denotes the red/green value, and b*, the yellow/blue value.

The lightness value, called L* Value, can range from 0 to 100, where white is 100 and black is 0—similar to grayscale. The a* value can range from +60 for red and −60 for green, and the b* value can range from +60 for yellow and −60 for blue. All samples measured have very small a* and b* values, they are colorless or in the so called neutral gray zone, which suggests that the lightness value can be used as grayscale for Platinum coatings.

Another example of a platinum surface coating for an electrode yields a rough surface with a surface area increase of greater than 5 times the surface area for a platinum surface of the same geometry having a regular shape with particle sizes ranging from 0.1 μm to 2.0 μm and has an average size of 0.4 μm to 0.6 μm, preferably about 0.5 μm. The thickness of the coating is 0.1 μm to 5.0 μm, preferably 1.0 μm to 4.0 μm, more preferably 3.3 μm to 3.8 μm. Some rough features with a scale in the nanometer range were present on each particle. The plated platinum layer is not believed to be porous. The bead shaped platinum particles with nanometer rough features on the particles increase the electrode's electrochemical active surface. The electrochemical capacitance of the electrode array with the surface coating of rough platinum is about 1300 $\mu F/cm^2$ to 1500 $\mu F/cm^2$, measured in a 10 mM phosphate buffered saline solution. The relation of the platinum surface area to the thickness of the platinum surface coating is of 4.0 $F/cm^3$ to 5.0 $F/cm^3$. The thin-film platinum disks have an average capacitance of less than 20 $\mu F/cm^2$ before plating, measured at the same condition. The electrochemical active surface area increase is 70 to 80, preferably about 71 to 75 fold.

The electroplating process with platinum can be preferably performed in an agues solution containing sodium dihydrogen phosphate ($NaH_2PO_4$) and/or disodium hydrogen phosphate ($Na_2HPO_4$) and platinum tetra chloride ($PtCl_4$) at 20° C. to 40° C. Different concentrations of platinum can be used and the range of platinum salt concentrations can be from 1 to 30 mM. Other Pt salts will also produce similar results.

Another example of a platinum surface coating yields an electrode having a rough surface with a surface area increase of greater than 5 times the surface area for a platinum surface of the same geometry having a regular shape with particle sizes ranging from 0.1 μm to 2.0 μm and has an average size of 0.4 μm to 0.6 μm, preferably about 0.5 μm. The thickness of the coating is 0.1 μm to 4.0 μm, preferably 2.0 µm to 3.0 µm, more preferably 2.3 µm to 2.8 µm. Some rough features with a scale in the nanometer range were present on each particle. The plated platinum layer is not believed to be porous. The bead shaped platinum particles with nanometer rough features on the particles increased electrode's electrochemical active surface. The electrochemical capacitance of the electrode array with the surface coating of rough platinum is about 1150 µF/cm$^2$ to 1680 µF/cm$^2$, measured in a 10 mM phosphate buffered saline solution. The relation of the platinum surface area to the thickness of the platinum surface coating is of 5.0 F/cm$^3$ to 6.0 F/cm$^3$. The thin-film platinum disks have an average capacitance of less than 20 µF/cm$^2$ before plating, measured at the same condition. The electrochemical active surface area increase is 65 to 75, preferably about 68 to 72 fold.

Figure 4:
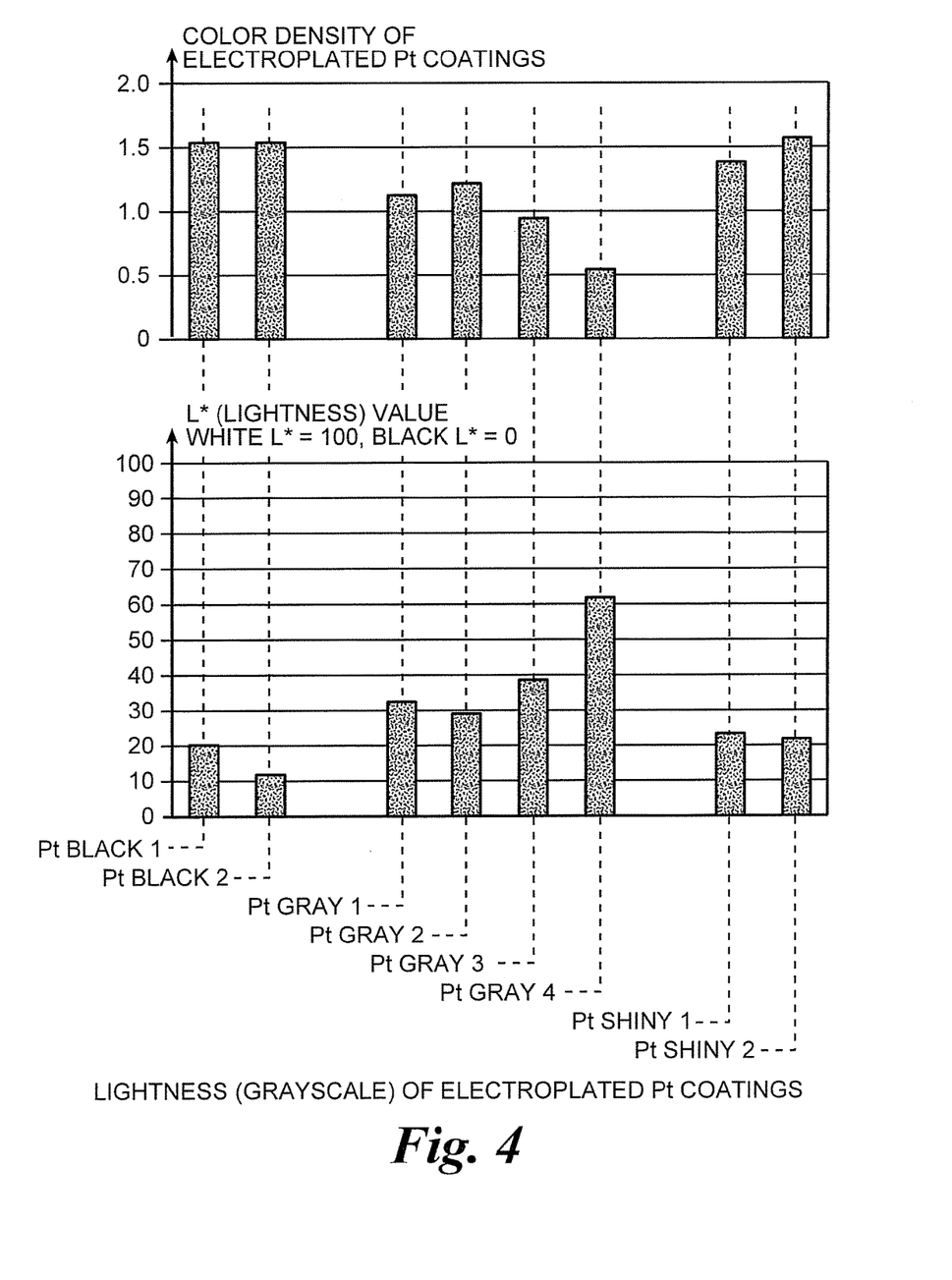
FIG. 4 depicts color density (D) values and lightness (L*) values for several representative samples of platinum gray, platinum black and shiny platinum.
Figure 5:
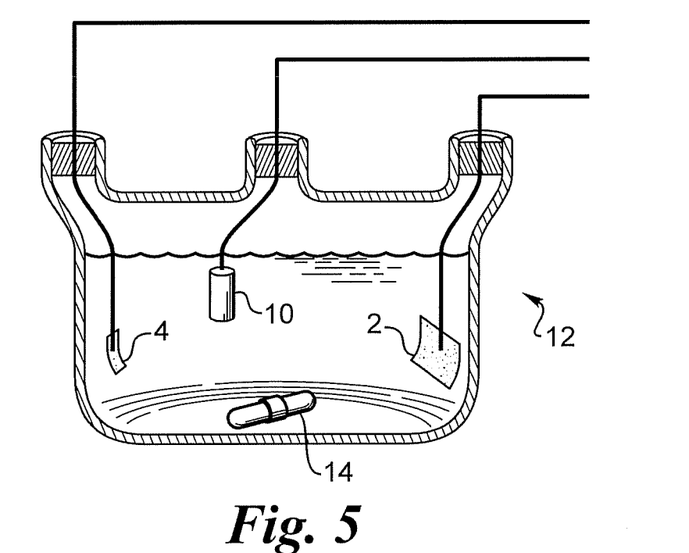
FIG. 5 depicts a three electrode electroplating cell with a magnetic stirrer.

The relation of the platinum surface area to the thickness of the platinum surface coating is of 4.0 F/cm$^3$ to 5.0 F/cm$^3$ as referred to in FIG. 4 and of 5 5.0 F/cm$^3$ to 6.0 F/cm$^3$ as referred to in FIG. 5. FIGS. 4 and 5 both depict a rough surface platinum coating according to the present invention. This value is calculated by dividing the electrochemically active platinum surface area (µF/cm$^3$) by the thickness of the platinum coating (µm). In comparison to the rough surface platinum coating the fractal platinum coating as referred to in FIG. 1 has a relation of the platinum surface area to the thickness of the platinum surface coating of 0.8 F/cm$^3$ to 1.5 F/cm$^3$. The rough platinum coating of the present invention yields on the same electrochemically active surface area a thinner coating with a higher capacitive volume compared with platinum gray.

Another example is a palladium surface coating for an electrode having a rough surface with a surface area increase of greater than 5 times the surface area for a palladium surface of the same geometry having a regular shape with particle sizes ranging from 0.1 µm to 3.0 µm, preferably from 0.5 µm to 1.5 µm. The thickness of the coating is 0.1 µm to 5.0 µm, preferably 0.5 µm to 2.0 µm.

Some rough features with a scale in the nanometer range were present on each particle. The plated palladium layer is not believed to be porous. The bead shaped palladium particles with nanometer rough features on the particles increase the electrode's electrochemical active surface. The electrochemical capacitance of the electrode array with the surface coating of rough palladium is about 100 µF/cm$^2$ to 300 µF/cm$^2$, measured in a 10 mM phosphate buffered saline solution. The thin-film platinum disks have an average capacitance of less than 20 µF/cm$^2$ before plating, measured at the same condition. The relation of the palladium surface area to the thickness of the palladium surface coating is of 1.5 F/cm$^3$ to 3.5 F/cm$^3$. The electrochemical active surface area increase is 50 to 70, preferably about 52 to 60 fold.

The smallest particles on the surface layer may be in the nanometer range. This rough structure increases the electrochemically active surface area of the palladium surface when compared to an electrode with a smooth palladium surface having the same geometric shape.

The surface is pure palladium because no impurities or other additives such as lead need to be introduced during the plating process to produce this palladium.

Another example is an iridium surface coating for an electrode having a rough surface with a surface area increase of greater than 5 times the surface area for an iridium surface of the same geometry having an irregular shape with particle sizes ranging from 0.01 µm to 2.0 µm, preferably from 0.1 µm to 1.0 µm. The coating has a thickness from 0.01 µm to 10 µm, preferably from 0.8 µm to 3.0 µm.

The plated iridium layer is not believed to be porous. The bead shaped iridium particles with nanometer rough features on the particles increase the electrode's electrochemical active surface. The electrochemical capacitance of the electrode array with the surface coating of rough palladium is about 1000 µF/cm$^2$ to 1300 µF/cm$^2$, measured in a 10 mM phosphate buffered saline solution. The thin-film platinum disks have an average capacitance of less than 20 µF/cm$^2$ before plating, measured at the same condition. The relation of the palladium surface area to the thickness of the palladium surface coating is of 4.5 F/cm$^3$ to 6.5 F/cm$^3$. The electrochemical active surface area increase is 55 to 70, preferably about 60 to 65 fold. The smallest particles on the surface layer may be in the nanometer range. This rough structure increases the electrochemically active surface area of the iridium surface when compared to an electrode with a smooth iridium surface having the same geometric shape.

The surface is pure iridium because no impurities or other additives such as lead need to be introduced during the plating process to produce this iridium.

The electroplating process with iridium can be preferably performed in an agues solution containing sodium dihydrogen phosphate ($NaH_2PO_4$) and/or disodium hydrogen phosphate (($Na_2HPO_4$)) and ammonium hexachloroiridate (($NH_4)_2IrCl_6$) at 20° C. to 40° C. Different concentrations of (($NH_4)_2IrCl_6$) can be used and the range of iridium salt concentrations can be from 3 to 30 mM. Other iridium salts such as ($NH_4)_3IrCl_6$ or $IrCl_4$ also produce similar, good results.

Referring to FIG. 4, the L*, a*, and b* values for representative samples of platinum gray, platinum black and shiny platinum are shown as measured on a color reflection spectrodensitometer, X-Rite 520. Platinum gray's L* value ranges from 25 to 90, while platinum black and shiny platinum both have L* values less than 25.

Referring to FIG. 4, color densities have also been measured for representative samples of platinum gray, platinum black and shiny platinum. Platinum gray's color density values range from 0.4D to 1.3D while platinum black and shiny platinum both have color density values greater than 1.3D.

Platinum gray can also be distinguished from platinum black based on the adhesive and strength properties of the thin film coating of the materials. Adhesion properties of thin film coatings of platinum gray and platinum black on 500 µm in diameter electrodes have been measured on a Micro Scratch Tester (CSEM Instruments, Switzerland). A controlled micro scratch is generated by drawing a spherical diamond tip of radius 10 µm across the coating surface under a progressive load from 1 millinewton to 100 millinewtons with a 400 µm scratch length. At a critical load the coating will start to fail. Using this test it is found that platinum gray can have a critical load of over 60 millinewtons while platinum black has a critical load of less than 35 millinewtons.

Referring to FIGS. 5 to 8, a method to produce platinum gray according to the present invention is described comprising connecting a platinum electrode 2, the anode, and a conductive substrate to be plated 4, the cathode, to a power source 6 with a means of controlling and monitoring 8 either the current or voltage of the power source 6. The anode 2, cathode 4, a reference electrode 10 for use as a reference in controlling the power source and an electroplating solution are placed in an electroplating cell 12 having a means 14 for mixing or agitating the electroplating solution. Power is supplied to the electrodes with constant voltage, constant current, pulsed voltage, scanned voltage or pulsed current to drive the electroplating process. The power source 6 is modified such that the rate of deposition will cause the platinum to deposit as platinum gray, the rate being greater than the deposition rate necessary to form shiny platinum and less than the deposition rate necessary to form platinum black.

Figure 6:
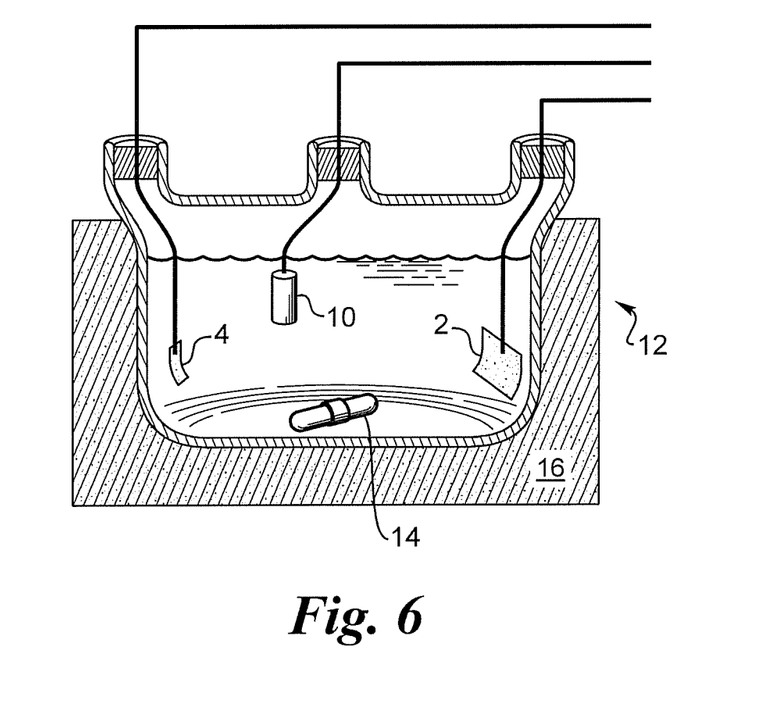
FIG. 6 depicts a three electrode electroplating cell in an ultrasonic tank.
Figure 7:
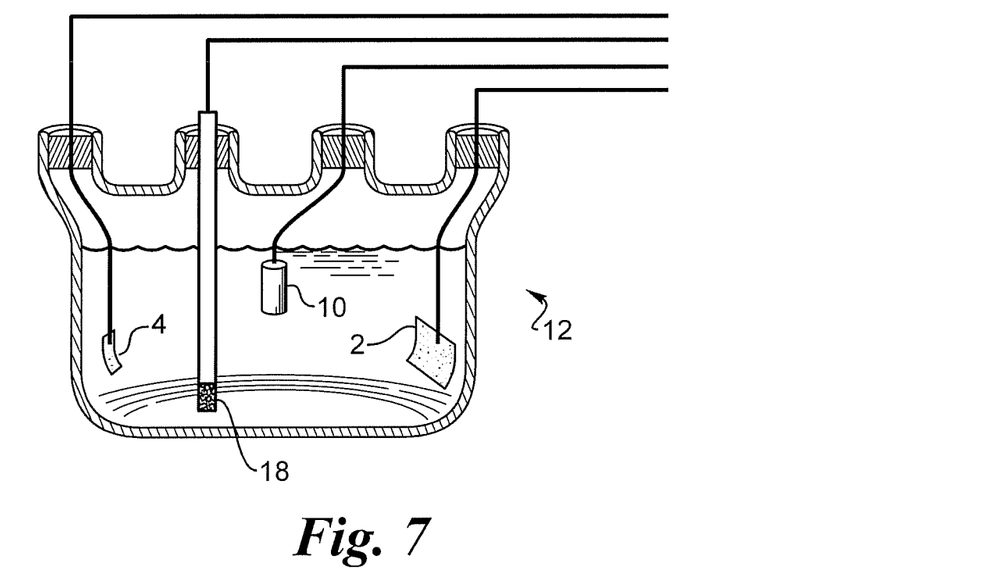
FIG. 7 depicts a three electrode electroplating cell with a gas dispersion tube.
Figure 8:
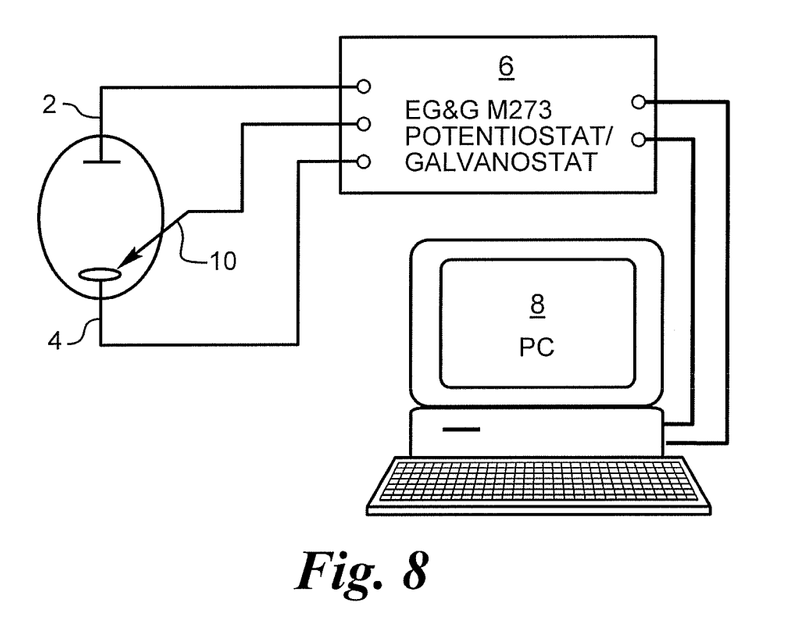
FIG. 8 depicts an electroplating system with constant voltage control or constant current control.

Referring to FIGS. 5 to 7, the electroplating cell 12, is preferably a 50 ml to 150 ml four neck glass flask or beaker, the common electrode 2, or anode, is preferably a large surface area platinum wire or platinum sheet, the reference electrode 10 is preferably a Ag/AgCl electrode, the conductive substrate to be plated 4, or cathode, can be any suitable material depending on the application and can be readily chosen by one skilled in the art. Preferable examples of the conductive substrate to be plated 4 include but are not limited to platinum, iridium, rhodium, gold, tantalum, titanium or niobium.

The stirring mechanism is preferably a magnetic stirrer 14 as shown in FIG. 5, an ultrasonic tank 16, such as the VWR Aquasonic 50D, as shown in FIG. 6, or gas dispersion 18 with Argon or Nitrogen gas as shown in FIG. 7. The plating solution is preferably 3 to 30 mM (milimole) ammonium hexachloroplatinate in disodium hydrogen phosphate, but may be derived from any chloroplatinic acid or bromoplatinic acid or other electroplating solution. The preferable plating temperature is approximately in the range of 24° C.-26° C.

Figure 9:
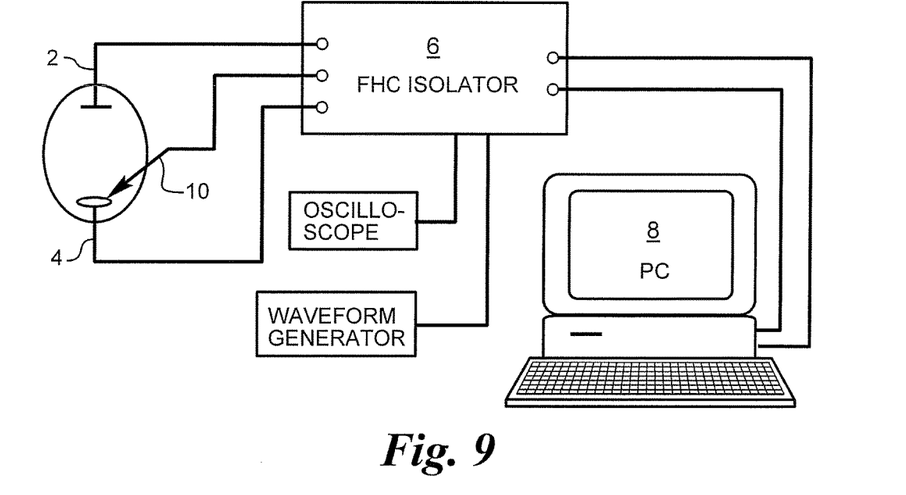
FIG. 9 depicts an electroplating system with pulsed current control.
Figure 10:
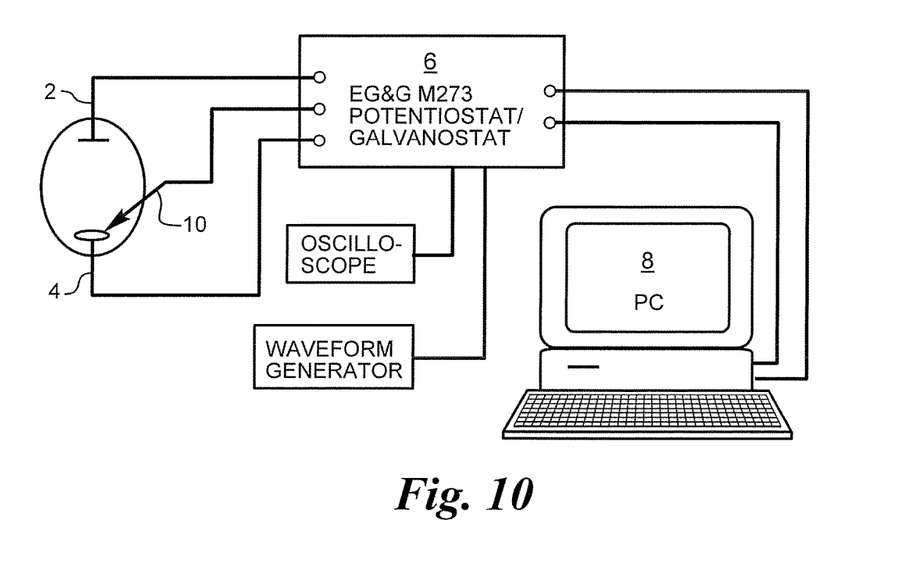
FIG. 10 depicts an electroplating system with pulsed voltage control.
Figure 11:
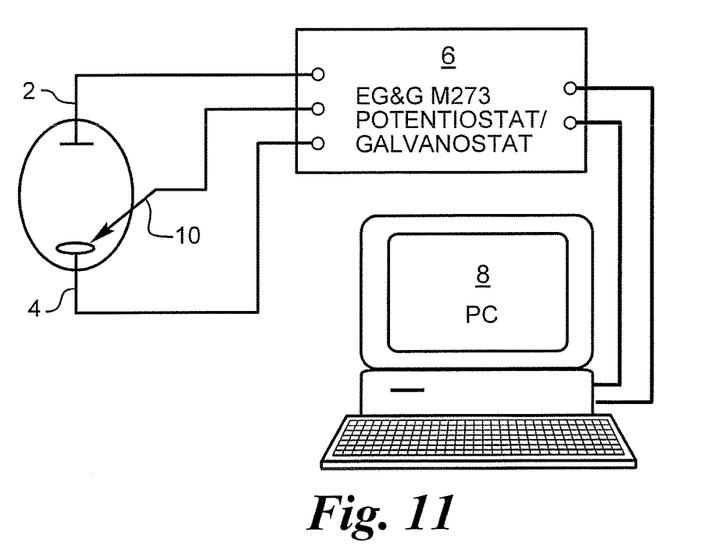
FIG. 11 depicts an electroplating system with scanned voltage control.

Electroplating systems with pulsed current and pulsed voltage control are shown in FIGS. 9 and 10 respectively. While constant voltage, constant current, pulsed voltage or pulsed current can be used to control the electroplating process, constant voltage control of the plating process has been found to be most preferable. The most preferable voltage range to produce platinum gray has been found to be in the range of −0.45 V to −0.85 V. Applying voltage in this range with the above solution yields a plating rate in the range of about 1 μm per minute to about 0.05 μm per minute, the preferred range for the plating rate of platinum gray. Constant voltage control also allows an array of electrodes in parallel to be plated simultaneously achieving a fairly uniform surface layer thickness for each electrode.

Figure 13:
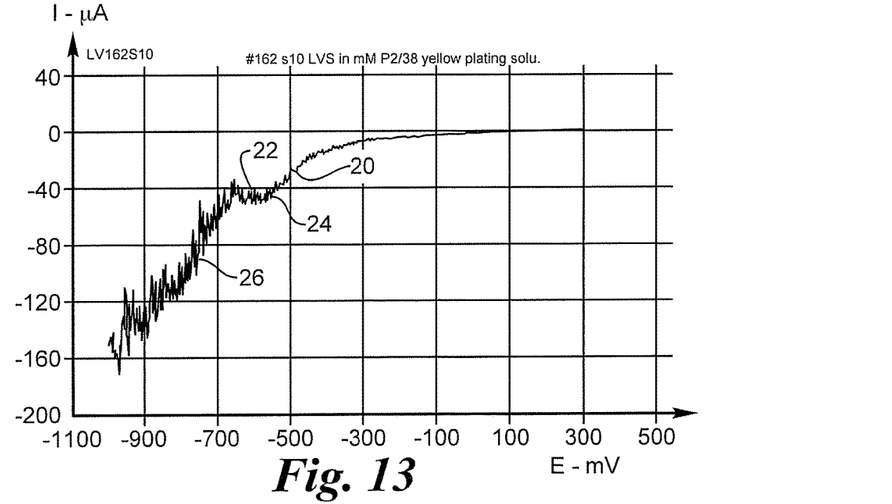
FIG. 13 depicts a representative linear voltage sweep of a representative platinum electrode.

The optimal potential ranges for platinum gray plating are solution and condition dependent. Linear voltage sweep can be used to determine the optimal potential ranges for a specific plating system. A representative linear voltage sweep is shown in FIG. 13. During linear voltage sweep, the voltage of an electrode is scanned cathodically until hydrogen gas starts developing revealing plating rate control steps of electron transfer 20 and diffusion 22. For a given plating system, it is preferable to adjust the electrode potential such that the platinum reduction reaction has a limiting current under diffusion control or mixed control 24 between diffusion and electron transfer but that does not result in hydrogen evolution 26.

Furthermore, it has been found that because of the physical strength of platinum gray, it is possible to plate surface layers of thickness greater than 30 μm. It is very difficult to plate shiny platinum in layers greater than approximately several microns because the internal stress of the dense platinum layer will cause the plated layer to peel off and the underlying layers cannot support the above material. The additional thickness of the plate's surface layer allows the electrode to have a much longer usable life.

The following example is illustrative of electroplating platinum on a conductive substrate to form a surface coating of platinum gray according to the present invention.

Electrodes with a surface layer of platinum gray are prepared in the following manner using constant voltage plating. An electrode platinum silicone array having 16 electrodes where the diameter of the platinum discs on the array range from 510 to 530 μm is first cleaned electrochemically in sulfuric acid and the starting electrode impedance is measured in phosphate buffered saline or acid solution. Referring to FIG. 5, the electrodes are arranged in the electroplating cell such that the plating electrode 2 is in parallel with the common electrode 4. The reference electrode 10 is positioned next to the electrode array 4. The plating solution is added to the electroplating cell 12 and the stirring mechanism 14 is activated.

A constant voltage is applied on the plating electrode 2 as compared to the reference electrode 10 using an EG&G PAR M273 potentiostat 6. The response current of the plating electrode 2 is recorded by a recording means 8. The response current is measured by the M273 potentiostat 6. After a specified time, preferably 1 minute-90 minutes, and most preferably 30 minutes, the voltage is terminated and the electrode array 4 is thoroughly rinsed in deionized water.

The electrochemical impedance of the electrode array 4 with the surface coating of platinum gray is measured in a saline or acid solution. The charge/charge density and average plating current/current density are calculated by integrating the area under the plating current vs. time curve. Energy Dispersed Analysis by X-ray (EDAX™) can be performed on selected electrodes. Scanning Electron Microscope (SEM) Micrographs of the plated surface can be taken showing its fractal surface. Energy Dispersed Analysis demonstrates that the sample is pure platinum rather than platinum oxide or some other materials.

From this example it is observed that the voltage range is most determinative of the formation of the fractal surface of platinum gray. For this system it observed that the optimal voltage drop across the electrodes to produce platinum gray is approximately −0.55 to −0.65 Volts vs. Ag/AgCl reference electrode. The optimal platinum concentration for the plating solution is observed to be approximately 8 to 18 mM ammonium hexachloroplatinate in 0.4 M (mole) disodium hydrogen phosphate.

Figure 12:
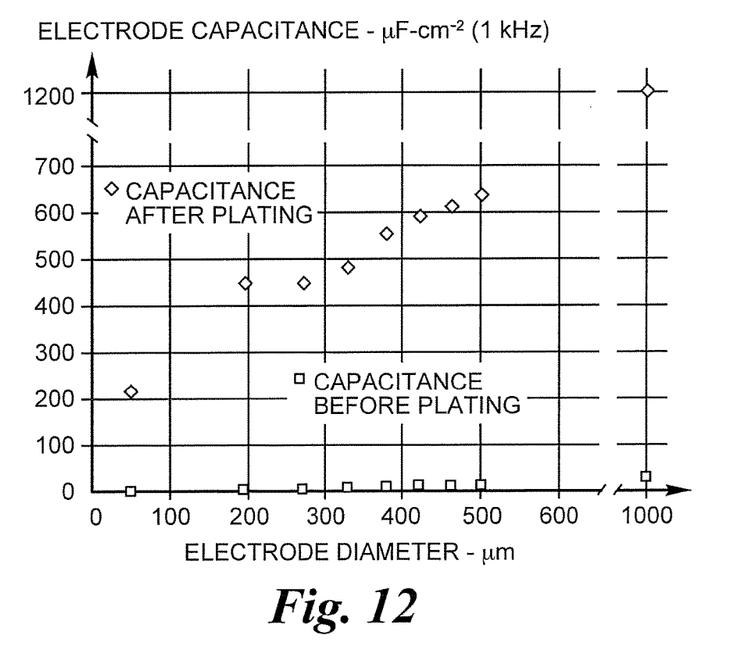
FIG. 12 depicts the electrode capacitance for both plated and unplated electrodes of varying diameter.

FIG. 12 shows the increase in electrode capacitance of several electrodes of varying diameter for a polyimide array plated according to the above example at −0.6 V vs. Ag/AgCl reference electrode for 30 minutes compared with unplated electrodes of the same diameters. Because the electrode capacitance is proportional to its surface area, the surface area increase, calculated from electrode capacitance, is 60 to 100 times that of shiny platinum for this array. Shiny platinum exhibits some roughness and has a surface area increase up to 3 times that of the basic geometric shape. While it is simple to measure a surface area change between two sample using capacitance, it is difficult to compare a sample with the basic geometric shape.

The present invention provides a very effective method for plating on smaller substrates by retaining the same or better effectiveness compared with known plating methods. This method is very useful for manufacturing miniaturized or micro fuel cells especially in the applications of hand-held electronics and some medical implants.

A change of conditions, including but not limited to the plating solution, surface area of the electrodes, pH, platinum concentration and the presence of additives, will also result in change of the optimal controlling voltage and/or other controlling parameters according to the basic electroplating principles. Platinum gray will still be formed so long as the rate of deposition of the platinum particles is slower than that for the formation of platinum black and faster than that for the formation of shiny platinum.

Figure 14:
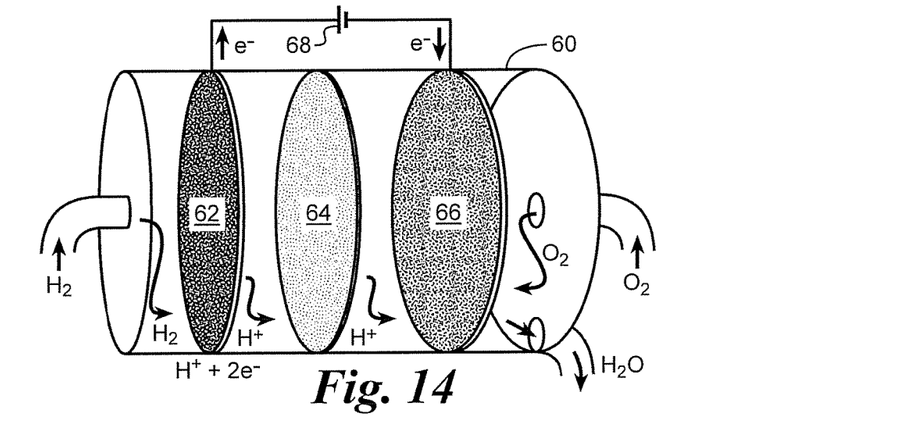
FIG. 14 depicts a schematic drawing of a fuel cell.

A fuel cell 60 is an electrochemical device as shown in FIG. 14 that combines hydrogen fuel and oxygen from the air to produce electricity, heat and water. Fuel cells operate without combustion, so they are virtually pollution free. Since the fuel is converted directly to electricity, a fuel cell can operate at much higher efficiencies than internal combustion engines, extracting more electricity from the same amount of fuel. The fuel cell itself has no moving parts, which makes it a quiet and reliable source of power.

The fuel cell 60 is composed of an anode 62, which is the negative electrode of the fuel cell 60, an electrolyte 64 in the center, which can be a liquid or a solid for example a membrane, and a cathode 66 which is the positive electrode of the fuel cell 60. As hydrogen flows into the fuel cell anode 62, a platinum catalyst in the anode facilitates the reaction from hydrogen gas into protons and electrons as shown in the equation 1 below.

$$2H_2 \xrightarrow{Pt_{anode}} 4H^+ + 4e^- \qquad 1.$$

The reaction (1) is facilitated by the anode due to the catalytic reaction performed by the electroplated platinum as catalyst. The electrons (e⁻) generated in the reaction (1) at the anode 62 flow through an external circuit 68 in the form of electric current.

The electrolyte 64 in the center allows only the protons to pass through the electrolyte 64 to the cathode 66 side of the fuel cell 60.

As oxygen flows into the fuel cell cathode 66 another platinum catalyst helps the oxygen, protons, and electrons combine to produce pure water and heat as shown in the equation 2 below.

$$O_2 + 4H^+ + 4e^- \xrightarrow{Pt_{cathode}} 2H_2O + \Delta_{heat} \qquad 2.$$

The overall chemical reaction which is performed in a fuel cell is shown in the equation 3 below.

$$2H_2 + O_2 \rightleftharpoons 2H_2O \qquad 3.$$

Individual fuel cells 60 can be combined into a fuel cell stack to obtain desired amount of electrical power. The number of fuel cells in the stack determines the total voltage, while the surface area of the cell determines its current.

According to the present invention platinum gray can be applied by electroplating for the coating of the anode 62 and cathode 66. Platinum gray provides an enlarged service area by applying less platinum for the coating and an improved adhesion to the substrate of the electrode. Platinum gray has the same or improved performance of the fuel cell 60 and at the same time a large amount of platinum can be saved. The fuel cell production is economical and ecological by using platinum gray for the coating of the anode 62 and the cathode 66.

Figure 15:
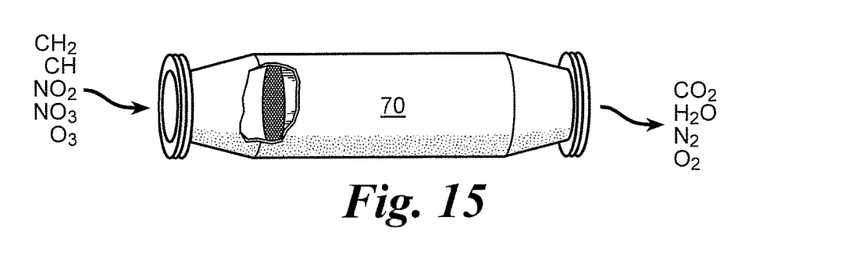
FIG. 15 depicts a side view of an autocatalyst.

A catalyst, especially an autocatalyst 70 is a cylinder of circular or elliptical cross section as shown in FIG. 15, made from ceramic or metal formed into a fine honeycomb and coated with a solution of chemicals and platinum group metals. It is mounted inside a stainless catalytic converter, and is installed in the exhaust line of the vehicle between the engine and a small muffler Vehicle exhaust contains a number of harmful elements which can be controlled by the platinum group metals in autocatalysts.

The major exhaust pollutants are carbon monoxide, which is a poisonous gas, oxides of nitrogen, which contribute to acid rain, low level ozone and smog formation and which exacerbate breathing problems, hydrocarbons, which are involved in the formation of smog and have an unpleasant smell, and particulate, which contains known cancer causing compounds.

Autocatalysts convert over 90 percent of hydrocarbons as shown in the equation 4 below:

$$CH_4 + 2O_2 \xrightarrow{Pt_{catalyst}} CO_2 + 2H_2O \qquad 4.$$

carbon monoxide as shown in the equation 5 below:

$$2CO + O_2 \xrightarrow{Pt_{catalyst}} 2CO_2 \qquad 5.$$

oxides of nitrogen from gasoline engines as shown in equations 6 and 7 below:

$$2NO_2 \xrightarrow{Pt_{catalyst}} N_2 + 2O_2 \qquad 6.$$

$$2NO_3 \xrightarrow{Pt_{catalyst}} N_2 + 3O_2 \qquad 7.$$

and ozone as shown in equation 8 below:

$$2O_3 \xrightarrow{Pt_{catalyst}} 3O_2 \qquad 8.$$

into less harmful carbon dioxide, nitrogen, water vapor and oxygen as shown above in the equations 3 to 7.

The dominant material of ceramic substrate for catalytic converters is porous cordierite, which can be used at temperatures up to 1300° C. Because of its nature of crystallization, chemical composition, cordierite has an extremely low thermal expansion coefficient. A low pressure drop, chemical inertness, fast heat up time, and structural stability at high temperatures make a ceramic honeycomb an ideal catalyst substrate for both oxidation and reduction catalysts.

According to the present invention metal can be applied by electroplating for the coating of the inside of a cylinder of circular or elliptical cross section made from ceramic or metal. Metal applied according to the present invention provides an enlarged surface area by applying less platinum for the coating and an improved adhesion to the substrate of the catalyst. Metal of the present invention has the same or improved performance of the catalyst. At the same time a large amount of metal, like platinum, palladium, or iridium can be saved. The catalyst production is economical and ecological by using metal of the present invention for the coating of the catalyst substrate.

The present invention will be further explained in detail by the following examples.

EXAMPLE 1

Electroplating Palladium on a Conductive Substrate

Palladium Plating Solution Preparation 2.7 g sodium dihydrogen phosphate (NaH₂PO₄) and 3.2 g disodium hydrogen phosphate (Na₂HPO₄) [Fluka] were dissolved in 100 ml deionized water, and stirred by magnetic stirring for 30 minutes. The concentrations for NaH₂PO₄ and Na₂HPO₄ were equally 225 mM. Then 0.18 g Palladium chloride (PdCl₂) [Aldrich] was added to the phosphate solution. The solution was then stirred for 30 minutes and filtered to black solids. The PdCl₂ concentration was about 5 mM. The pH of the solution was measured at 6.8. The color of the solution was brown. The solution was deaerated before the plating process by bubbling nitrogen through the solution.

Preparation of the Substrate

A thin-film platinum polyimide array was used for palladium plating. The array included 16 electrodes with 200 μm thin-film Pt disk as exposed electrode surface. All the electrodes in the array were shorted to common contact points for the plating. The Pt disk electrodes were first electrochemically cleaned by bubbling the surface with oxygen at +2.8V vs Ag/AgCl in 0.5 M $H_2SO_4$ for 10 sec. Then the surface was cleaned by bubbling with hydrogen at −1.2 V vs Ag/AgCl in 0.5 M $H_2SO_4$ for 15 sec. This removes surface contaminations and polymer residues.

Electroplating Cell

A classical Pyrex glass three-electrode reaction cell was used for the electroplating. The reference electrode compartment was separated from the reaction compartment by a Vicor porous fit, in order to avoid the migration of concentrated KCl and AgCl from the inner filling solution of the reference electrode to the plating bath. The counter electrode was a platinized-platinum sheet of a real surface area equal to 1.8 $cm^2$.

A digital magnetic stirrer (Dataplate PMC720) was used to agitate the solution during plating. The solution temperatures were from 15° C. to 80° C. and were controlled by a VWR circulating water bath with a digital temperature controller (VWR 1147P).

The potential was controlled by using an EG&G PARC model 273 potentiostat-galvanostat and the response current, current density and charge were recorded by EG&G PARC M270 software. The charge/charge density and average plating current/current density were calculated by integrating the area under the plating current vs. time curve. The plating time was from 1 minute to 120 minutes.

Palladium Plating

A platinum polyimide electrode array having 16 electrodes (FIG. 14) having a diameter of 200 μm platinum disc on the array was cleaned electrochemically in 0.5 M $H_2SO_4$. The electrode array was placed in an electroplating cell containing a plating solution having a concentration of 5 mM palladium chloride in 0.025 M sodium dihydrogen phosphate and 0.425 M disodium hydrogen phosphate. The plating bath temperature was at 22° C. A constant voltage of −1.0 V vs Ag/AgCl reference electrode was applied on the electrode and terminated after 10 minutes. The electrode array was thoroughly rinsed in deionized water. The charge/charge density and average plating current/current density were calculated by integrating the area under the plating current vs. time curve. The current density was near linearly increased from initial 0.96 $A/cm^2$ to final 3.5 $A/cm^2$. The electrochemical capacitance of the electrode array with the surface coating of rough palladium was 190 $\mu F/cm^2$, measured in a 10 mM phosphate buffered saline solution. The smooth thin-film Pt disks measured at the same condition before plating an average capacitance of less than 20 $\mu F/cm^2$. The electrochemical active surface area increase is about 10 fold in this case. The optimal voltage drop across the electrodes for producing rough iridium was from −0.8 to −1.3 Volts vs. Ag/AgCl reference electrode. The plated palladium surface coating thickness was about 1.0 μm.

Example 1 yields a palladium surface coating having a rough surface as shown in FIG. 4. The electrochemical active surface area increase is about 10 fold. The relation of surface area to the thickness of the platinum surface coating is 1.90 $F/cm^3$ [surface coating of rough platinum 190 $\mu F/cm^2$ per thickness of the platinum coating of 1.0 μm.] The palladium surface coating adhesive strength was 54 mN. The palladium coating contains particles with very regular particle shape and regular average size. The coating is thinner than known coatings and has a rough surface which is mainly not porous with a large surface area. The coating provides a good adherence between the substrate and the platinum coating. The palladium coated electrode is biocompatible and therefore implantable and provides less tissue reaction.

EXAMPLE 2

Electroplating Iridium on a Conductive Substrate

Iridium Plating Solution Preparation 0.3 g sodium dihydrogen phosphate ($NaH_2PO_4$) and 6.03 g disodium hydrogen phosphate ($Na_2HPO_4$) [Fluka] were dissolved in 100 ml deionized water, magnetic stirring for 30 minutes. The concentrations for $NaH_2PO_4$ and $Na_2HPO_4$ were 25 mM and 425 mM, respectively. Then 0.882 g of Ammonium hexachloroiridate (($NH_4$)$_2IrCl_6$) from [Alfa Aesar] was added to the phosphate solution to form the iridium salt concentrations of 20 mM. The solution was stirred for 30 minutes prior to plating. The pH of the solution was measured at 7.9. The initial color of the solution is brown and changed to dark blue after overnight aging.

Preparation of the Substrate

A thin-film platinum polyimide array was used for iridium plating. The array had 16 electrodes with 200 μm thin-film Pt disk as exposed electrode surface. All electrodes in the array were shorted to a common contact points for the plating. The Pt disk electrodes were first electrochemically cleaned by bubbling the surface with oxygen at +2.8 V vs Ag/AgCl in 0.5 M $H_2SO_4$ for 10 sec. Then the surface was cleaned by bubbling with hydrogen at −1.2 V vs Ag/AgCl in 0.5 M $H_2SO_4$ for 15 sec. This removes surface contaminations and polymer residues.

Electroplating Cell

A classical Pyrex glass three-electrode reaction cell was used for the electroplating. The reference electrode compartment was separated from the reaction compartment by a Vicor porous frit, in order to avoid the migration of concentrated KCl and AgCl from the inner filling solution of the reference electrode to the plating bath. The counter electrode was a platinized-platinum sheet of a real surface area equal to 1.8 $cm^2$.

A digital magnetic stirrer (Dataplate PMC720) was used to agitate the solution during plating. The solution temperatures were from 15° C. to 80° C. and were controlled by a VWR circulating water bath with a digital temperature controller (VWR 1147P).

The potential was controlled by using an EG&G PARC model 273 potentiostat-galvanostat and the response current, current density and charge were recorded by EG&G PARC M270 software. The charge/charge density and average plating current/current density were calculated by integrating the area under the plating current vs. time curve. The plating time was from 1 minute to 120 minutes.

Iridium Plating

A platinum polyimide electrode array having 16 electrodes (FIG. 14) having a diameter of 200 μm platinum disc on the array was cleaned electrochemically in 0.5 M $H_2SO_4$. The electrode array was placed in an electroplating cell containing a plating solution having a concentration of 28 mM ammonium hexachloroiridate in 0.025 M sodium dihydrogen phosphate and 0.425 M disodium hydrogen phosphate. The plating bath temperature was at 32° C. A constant voltage of −2.5 V vs Ag/AgCl reference electrode was applied on the electrode and terminated after 60 minutes. The electrode array was thoroughly rinsed in deionized water. The charge/charge density and average plating current/current density were calculated by integrating the area under the plating current vs. time curve. The current density was near linearly increased from initial 1.6 A/cm$^2$ to final 2.2 A/cm$^2$. The electrochemical capacitance of the electrode array with the surface coating of rough iridium was 1115 μF/cm$^2$, measured in a 10 mM phosphate buffered saline solution. The thin-film Pt disks measured before plating at the same conditions an average capacitance of lower than 20 μF/cm$^2$. The electrochemical active surface area increase is about 56 fold in this case. The optimal voltage drop across the electrodes for producing rough iridium was from −1.5 to −3.0 Volts vs. Ag/AgCl reference electrode. The plated iridium surface coating thickness was about 2.0 μm. The electrochemical active surface area increase is about 56 fold. The relation of surface area to the thickness of the iridium surface coating is 5.58 F/cm$^3$ [surface coating of rough iridium 1115 μF/cm$^2$ per thickness of the iridium coating of 2.0 μm.] The platinum surface coating adhesive strength was 62 mN.

Example 2 yields an iridium surface coating having a rough surface as shown in FIG. 5. The iridium coating contains particles with very regular particle shape and regular average size. The coating is thinner than known coatings and has a rough surface which is mainly not porous with a large surface area. The coating provides a good adherence between the substrate and the coating. The iridium coated electrode is biocompatible and therefore implantable and provides less tissue reaction.

EXAMPLE 3

Electroplating Platinum on a Conductive Substrate

Platinum Plating Solution Preparation 0.3 g sodium dihydrogen phosphate (NaH$_2$PO$_4$) and 6.03 g disodium hydrogen phosphate (Na$_2$HPO$_4$) [Fluka] were dissolved in 100 ml deionized water, and stirred by magnetic stirring for 30 minutes. The concentrations for NaH$_2$PO$_4$ and Na$_2$HPO$_4$ were 25 mM and 425 mM. Then 0.5 g of Platinum chloride (PtCl$_4$) [Alfa Aesar] was added to the phosphate solution to form the platinum salt concentrations of 15 mM. The solution was then stirred for 30 minutes. Different concentrations of (PtCl$_4$) were used in the experiments and the range of Pt salt concentrations was from 3 to 30 mM. The pH of the solution was measured at 7.9. The color of the solution was amber. The solution was deaerated before the plating process by bubbling nitrogen through the solution.

Preparation of the Substrate

A thin-film platinum polyimide array was used for platinum plating. The array included 16 electrodes with 200 μm thin-film Pt disk as exposed electrode surface. All the electrodes in the array were shorted to common contact points for the plating. The Pt disk electrodes were first electrochemically cleaned by bubbling the surface with oxygen at +2.8V vs Ag/AgCl in 0.5 M H$_2$SO$_4$ for 10 sec. Then the surface was cleaned by bubbling with hydrogen at −1.2 V vs Ag/AgCl in 0.5 M H$_2$SO$_4$ for 15 sec to remove surface contaminations and polymer residues.

Electroplating Cell

A classical Pyrex glass three-electrode reaction cell was used for the electroplating. The reference electrode compartment was separated from the reaction compartment by a Vicor porous frit, in order to avoid the migration of concentrated KCl and AgCl from the inner filling solution of the reference electrode to the plating bath. The counter electrode was a platinized-platinum sheet of a real surface area equal to 1.8 cm$^2$.

A digital magnetic stirrer (Dataplate PMC720) was used to agitate the solution during plating. The solution temperatures were from 15° C. to 80° C. and were controlled by a VWR circulating water bath with a digital temperature controller (VWR 1147P).

The potential was controlled by using an EG&G PARC model 273 potentiostat-galvanostat and the response current, current density and charge were recorded by EG&G PARC M270 software. The charge/charge density and average plating current/current density were calculated by integrating the area under the plating current vs. time curve. The plating time was from 1 minute to 60 minutes.

Platinum Plating

A platinum polyimide electrode array having 16 electrodes (FIG. 14) having a diameter of 200 μm platinum disc on the array was cleaned electrochemically in 0.5 M H$_2$SO$_4$. The electrode array was placed in an electroplating cell containing a plating solution having a concentration of 15 mM platinum chloride in 0.025 M sodium dihydrogen phosphate and 0.425 M disodium hydrogen phosphate. The plating bath temperature was at 22° C. A constant voltage of −0.525 V vs Ag/AgCl reference electrode was applied on the electrode and terminated after 10 minutes. The electrode array was thoroughly rinsed in deionized water. The charge/charge density and average plating current/current density were calculated by integrating the area under the plating current vs. time curve. The current density was near linearly increased from initial 11.1 A/cm$^2$ to final 15.2 A/cm$^2$. The electrochemical capacitance of the electrode array with the surface coating of rough platinum was 1462 μF/cm$^2$, measured in a 10 mM phosphate buffered saline solution. The thin-film Pt disks only have an average capacitance of less than 20 μF/cm$^2$ before plating measured at the same condition. The optimal voltage drop across the electrodes for producing rough platinum was from −0.4 to −0.7 Volts vs. Ag/AgCl reference electrode. The plated platinum surface coating thickness is about 3.5 μm. The electrochemical active surface area increase is about 73 fold. The relation of surface area to the thickness of the platinum surface coating is 4.18 F/cm$^3$ [surface coating of rough platinum 1462 μF/cm$^2$ per thickness of the platinum coating of 3.5 μm.] The platinum surface coating adhesive strength was 55 mN.

The platinum coating contains particles with very regular particle shape and regular average size. The coating is thinner than known platinum coatings and has a rough surface which is mainly not porous with a large surface area. The coating provides a good adherence between the substrate and the platinum coating. The platinum coated electrode is biocompatible and therefore implantable and provides less tissue reaction.

EXAMPLE 4

Electroplating Platinum on a Conductive Substrate

Platinum Plating Solution Preparation 0.3 g sodium dihydrogen phosphate ($NaH_2PO_4$) and 6.03 g disodium hydrogen phosphate ($Na_2HPO_4$) [Fluka] were dissolved in 100 ml deionized water, and stirred by magnetic stirring for 30 minutes. The concentrations for $NaH_2PO_4$ and $Na_2HPO_4$ were 25 mM and 425 mM. Then 0.5 g of Platinum chloride ($PtCl_4$) [Alfa Aesar] was added to the phosphate solution to form the platinum salt concentrations of 15 mM. The solution was then stirred for 30 minutes and filtered to black solids. Different concentrations of ($PtCl_4$) were used in the experiments and the range of Pt salt concentrations was from 3 to 30 mM. The pH of the solution was measured at 7.9. The color of the solution was amber. The solution was deaerated before the plating process by bubbling nitrogen through the solution.

Preparation of the Substrate

A thin-film platinum polyimide array was used for platinum plating. The array included 16 electrodes with 200 µm thin-film Pt disk as exposed electrode surface. All the electrodes in the array were shorted to common contact points for the plating. The Pt disk electrodes were first electrochemically cleaned by bubbling the surface with oxygen at +2.8V vs Ag/AgCl in 0.5 M $H_2SO_4$ for 10 sec. Then the surface was cleaned by bubbling with hydrogen at −1.2 V vs Ag/AgCl in 0.5 M $H_2SO_4$ for 15 sec to remove surface contaminations and polymer residues.

Electroplating Cell

A classical Pyrex glass three-electrode reaction cell was used for the electroplating. The reference electrode compartment was separated from the reaction compartment by a Vicor porous frit, in order to avoid the migration of concentrated KCl and AgCl into the inner filling solution of the reference electrode. The counter electrode was a platinized-platinum sheet of a real surface area equal to 1.8 $cm^2$.

A digital magnetic stirrer (Dataplate PMC720) was used to agitate the solution during plating. The solution temperatures were from 15° C. to 80° C. and were controlled by a VWR circulating water bath with a digital temperature controller (VWR 1147P). The potential was controlled by using an EG&G PARC model 273 potentiostat-galvanostat and the response current, current density and charge were recorded by EG&G PARC M270 software. The charge/charge density and average plating current/current density were calculated by integrating the area under the plating current vs. time curve. The plating time was from 1 minute to 60 minutes.

Platinum Plating

A platinum polyimide electrode array having 16 electrodes (FIG. 14) having a diameter of 200 µm platinum disc on the array was cleaned electrochemically in 0.5 M $H_2SO_4$. The electrode array was placed in an electroplating cell containing a plating solution having a concentration of 15 mM platinum chloride in 0.025 M sodium dihydrogen phosphate and 0.425 M disodium hydrogen phosphate. The plating bath temperature was at 22° C. A constant voltage of −0.5 V vs Ag/AgCl reference electrode was applied on the electrode and terminated after 10 minutes. The electrode array was thoroughly rinsed in deionized water. The charge/charge density and average plating current/current density were calculated by integrating the area under the plating current vs. time curve. The current density was near linearly increased from initial 10.8 $A/cm^2$ to final 14.6 $A/cm^2$. The electrochemical capacitance of the electrode array with the surface coating of rough platinum was 1417 $\mu F/cm^2$, measured in a 10 mM phosphate buffered saline solution. The thin-film Pt disks only have an average capacitance of less than 20 $\mu F/cm^2$ before plating measured at the same condition. The optimal voltage drop across the electrodes for producing rough platinum was from −0.4 to −0.7 Volts vs. Ag/AgCl reference electrode. The plated platinum surface coating thickness is about 2.5 µm. The electrochemical active surface area increase is about 70 fold. The relation of surface area to the thickness of the platinum surface coating is 5.67 $F/cm^3$ [surface coating of rough platinum 1417 $\mu F/cm^2$ per thickness of the platinum coating of 2.5 µm.] The platinum surface coating adhesive strength was 58 mN.

The platinum coating contains particles with very regular particle shape and regular average size. The coating is thinner than known platinum coatings and has a rough surface which is mainly not porous with a large surface area. The coating provides a good adherence between the substrate and the platinum coating. The platinum coated electrode is biocompatible and therefore implantable and provides less tissue reaction.

EXAMPLE 5

Electroplating Platinum Gray on a Conductive Substrate

A platinum polyimide electrode array having 16 electrodes (FIG. 14) having a diameter of 200 µm platinum disc on the array was cleaned electrochemically in 0.5 M $H_2SO_4$. The electrode array was placed in an electroplating cell containing a plating solution having a concentration 20 mM ammonium hexachloroplatinate, 0.025 M sodium dihydrogen phosphate and 0.425 M disodium hydrogen phosphate. The voltage of −0.65 V was terminated after 30 minutes. The electrode was thoroughly rinsed in deionized water. The electrochemical capacitance of the electrode with the surface coating of platinum gray was 1200 $\mu F/cm^2$, measured in a 10 mM phosphate buffered saline solution. The charge/charge density and average plating current/current density were calculated by integrating the area under the plating current vs. the time curve. The optimal voltage drop across the electrodes for producing platinum gray was from −0.55 to −0.75 Volts vs. Ag/AgCl reference electrode.

The platinum coating showed the following properties:
platinum surface coating thickness: 11.0 µm;
electrochemical active surface area increase: 60 fold;
platinum surface coating adhesive strength: 50 mN; and
platinum surface coating color density: 1.0 D.

Example 5 yields a platinum surface coating having a fractal surface as shown in FIG. 1. The relation of surface area to the thickness of the platinum surface coating is 1.09 $F/cm^3$ [surface coating of rough platinum 1200 $\mu F/cm^2$ per thickness of the platinum coating of 11.0 µm.] The coating provides a good adherence between the substrate and the platinum coating. The platinum coated electrode is biocompatible and therefore implantable and provides less tissue reaction.

The plating conditions and properties of the platinum coatings performed in Examples 1 to 5 are summarized in the following tables 1 to 3.

TABLE 1

Conditions of the Plating Reactions

| Conditions | Plating Agent | Temp. | Voltage | Time |
|---|---|---|---|---|
| Example 1 Rough Pd | 5 mM $PdCl_2$ | 22° C. | −1.0 V | 10 min |
| Example 2 Rough Ir | 28 mM $NH_4[PtIr_6]$ | 32° C. | −2.5 V | 60 min |
| Example 3 Rough Pt | 15 mM $PtCl_4$ | 22° C. | −0.525 V | 10 min |
| Example 4 Rough Pt | 15 mM $PtCl_4$ | 22° C. | −0.5 V | 10 min |
| Example 5 Fractal Pt | 20 mM $NH_4[PtCl_6]$ | 22° C. | −0.6 V | 30 min |

TABLE 2

Properties of the Coatings

| Properties | Final Capacitance | Thickness | Area Increase | Coating/Thickness |
|---|---|---|---|---|
| Example 1 Rough Pd | 190 $\mu F/cm^2$ | 1.0 μm | 10 fold | 1.90 $F/cm^3$ |
| Example 2 Rough Ir | 1115 $\mu F/cm^2$ | 2.0 μm | 56 fold | 5.58 $F/cm^3$ |
| Example 3 Rough Pt | 1462 $\mu F/cm^2$ | 3.5 μm | 73 fold | 4.18 $F/cm^3$ |
| Example 4 Rough Pt | 1417 $\mu F/cm^2$ | 2.5 μm | 70 fold | 5.67 $F/cm^3$ |
| Example 5 Fractal Pt | 1200 $\mu F/cm^2$ | 11.0 μm | 60 fold | 1.09 $F/cm^3$ |

TABLE 3

Properties of the Coatings

| Properties | Adhesive Strength | Current Density Initial to Final | Voltage Drop Across the Electrodes |
|---|---|---|---|
| Example 1 Rough Pd | 54 mN | 0.96 $A/cm^2$ to 3.5 $A/cm^2$ | −0.8 V to −1.3 V |
| Example 2 Rough Ir | 60 mN | 1.6 $A/cm^2$ to 2.2 $A/cm^2$ | −1.5 V to −3.0 V |
| Example 3 Rough Pt | 55 mN | 11.1 $A/cm^2$ to 15.2 $A/cm^2$ | −0.4 V to −0.7 V |
| Example 4 Rough Pt | 58 mN | 10.8 $A/cm^2$ to 14.6 $A/cm^2$ | −0.4 V to −0.7 V |
| Example 5 Fractal Pt | 50 mN | 15.1 $A/cm^2$ to 24.5 $A/cm^2$ | −0.55 V to −0.75 V |

While the invention has been described by means of specific embodiments and applications thereof, it is understood that numerous modifications and variations could be made thereto by those skilled in the art without departing from the spirit and scope of the invention. It is therefore to be understood that within the scope of the claims, the invention may be practiced otherwise than as specifically described herein.

What we claim is:

1. A hydrogen fuel cell comprising:
   an anode;
   a cathode; and
   an electrolyte in contact with the anode and cathode;
   wherein the anode and/or a cathode comprises an electrode including a platinum conductive substrate having a basic geometric shape and a platinum surface coating on the platinum conductive substrate and having a surface area of 5 to 500 times the basic geometric shape, regular shaped particles in sizes ranging from 0.1 μm to 2.0 μm and providing an increased electrochemically active surface area;
   wherein the platinum surface coating requires less platinum and improved adhesive strength as compared to platinum black.

2. The hydrogen fuel cell according to claim 1, wherein the conductive substrate is non-porous.

3. A method for manufacturing of a hydrogen fuel cell comprising:
   providing a platinum conductive substrate having a basic geometric shape;
   electroplating the platinum conductive substrate with a platinum coating and having a surface area of 5 to 500 times the basic geometric shape, regular shaped particles in sizes ranging from 0.1 μm to 2.0 μm and providing an increased electrochemically active surface area without reducing structural strength;
   placing the conductive substrate in an electrolyte to form a fuel cell;
   wherein the platinum surface coating requires less platinum and improved adhesive strength as compared to platinum black.

4. The method according to claim 3, wherein the step of electroplating the surface of the conductive substrate is at a rate such that the particles are form on the conductive substrate faster than necessary to form shiny platinum and slower than necessary to form platinum black.

5. The method according to claim 3, wherein the step of electroplating is accomplished at a rate of more than 0.05 microns per minute, but less than 1 micron per minute.

6. The method according to claim 5, wherein the voltage is a constant voltage.

7. The method according to claim 5, wherein the controlled voltage causes at least a partially diffusion limited plating reaction.

8. The method according to claim 3, wherein the electroplating is accomplished at a rate of greater or equal to 1 micron per minute, but less than 10 microns per minute.

9. The method according to claim 3, wherein the electroplating is controlled by the electrode voltage.

10. The method according to claim 3, wherein the voltage of the electroplating is less than 0.2 Volts and greater than −1 Volts vs. Ag/AgCl reference electrode.

11. The method according to claim 3, wherein the electroplating solution is at least 3 mM but less than 30 mM ammonium hexachloroplatinate in about 0.4 M disodium hydrogen phosphate.

12. The method according to claim 3 wherein the conductive substrate is non-porous.

* * * * *